United States Patent
Gelman

(10) Patent No.: US 10,545,520 B2
(45) Date of Patent: Jan. 28, 2020

(54) SERIAL BUS PROTOCOL ENCODING FOR VOLTAGE REGULATOR WITH SUPPORT FOR DVFS

(71) Applicant: Chaoyang Semiconductor Jiangyin Technology Co., Ltd., Jiangyin (CN)

(72) Inventor: Anatoly Gelman, San Diego, CA (US)

(73) Assignee: Chaoyang Semiconductor Jiangyin Technology Co., Ltd., Jiangyin (CN)

( * ) Notice: Subject to any disclaimer, the term of this patent is extended or adjusted under 35 U.S.C. 154(b) by 0 days.

(21) Appl. No.: 16/137,359

(22) Filed: Sep. 20, 2018

(65) Prior Publication Data

US 2019/0094894 A1    Mar. 28, 2019

Related U.S. Application Data

(60) Provisional application No. 62/562,313, filed on Sep. 22, 2017.

(51) Int. Cl.
| | |
|---|---|
| *H02M 3/10* | (2006.01) |
| *G05F 1/46* | (2006.01) |
| *G06F 9/38* | (2018.01) |
| *H02M 3/06* | (2006.01) |

(52) U.S. Cl.
CPC ............ *G05F 1/468* (2013.01); *G06F 9/3851* (2013.01); *H02M 3/06* (2013.01); *H02M 3/10* (2013.01)

(58) Field of Classification Search
None
See application file for complete search history.

(56) References Cited

U.S. PATENT DOCUMENTS

| | | | |
|---|---|---|---|
| 6,316,988 B1* | 11/2001 | Forehand | G11B 19/00 323/283 |
| 8,427,131 B2 | 4/2013 | Bryson et al. | |
| 2003/0120922 A1* | 6/2003 | Sun | G06F 21/575 713/168 |
| 2004/0128565 A1* | 7/2004 | Horigan | G06F 1/26 713/300 |
| 2006/0284674 A1* | 12/2006 | Hong | G06F 1/26 330/129 |
| 2009/0158071 A1* | 6/2009 | Ooi | G06F 1/26 713/340 |

(Continued)

FOREIGN PATENT DOCUMENTS

| | | |
|---|---|---|
| CN | 105404500 A | 3/2016 |
| JP | 2004064936 A | 2/2004 |

OTHER PUBLICATIONS

International Search Report on related PCT Application No. PCT/IB2018/057273 from International Searching Authority (CNIPA) dated Jan. 29, 2019.

(Continued)

*Primary Examiner* — Jeffrey A Gblende
(74) *Attorney, Agent, or Firm* — Klein, O'Neill & Singh, LLP

(57) ABSTRACT

Systems and methods for changing an output voltage of a voltage regulator are disclosed. A voltage change command that is serially transmitted from a control system to a voltage regulator is used to indicate that a change is output voltage is requested. The voltage change command is a serial stream that is less than a byte in length and includes a 1-bit write operation field, a 1-bit voltage change field and up to 6 bits of voltage change information.

17 Claims, 7 Drawing Sheets

(56) References Cited

U.S. PATENT DOCUMENTS

2012/0068737 A1* 3/2012 Tuten ............... H02M 3/157
　　　　　　　　　　　　　　　　　　　　　327/50
2012/0323394 A1* 12/2012 Gandhi ............ H05B 33/0857
　　　　　　　　　　　　　　　　　　　　　700/297
2013/0249290 A1 9/2013 Buonpane et al.

OTHER PUBLICATIONS

Written Opinion on related PCT Application No. PCT/IB2018/057273 from International Searching Authority (CNIPA) dated Jan. 29, 2019.

* cited by examiner

| READ/WRITE 1st transmitted bit (505) | VOLTAGE CHANGE/OTHER 2nd transmitted bit (510) | VOLTAGE CODE 3rd through 8th transmitted bits (515) |
|---|---|---|
| 0 | FOLLOWS ENCODING FOR NORMAL READ TRANSACTION | FOLLOWS ENCODING FOR NORMAL READ TRANSACTION |
| 1 | 0 | OTHER FUNCTION |
|   | 1 | VOLTAGE CODE |

FIG. 7A

| READ/WRITE 1st transmitted bit (505) | VOLTAGE CHANGE/OTHER 2nd transmitted bit (510) | VOLTAGE CODE 3rd through 8th transmitted bits (515) |
|---|---|---|
| 0 | FOLLOWS ENCODING FOR NORMAL READ TRANSACTION | FOLLOWS ENCODING FOR NORMAL READ TRANSACTION |
| 1 | 1 | OTHER FUNCTION |
|   | 0 | VOLTAGE CODE |

FIG. 7B

| READ/WRITE 1st transmitted bit (505) | VOLTAGE CHANGE/OTHER 2nd transmitted bit (510) | VOLTAGE CODE 3rd through 8th transmitted bits (515) |
|---|---|---|
| 1 | FOLLOWS ENCODING FOR NORMAL READ TRANSACTION | FOLLOWS ENCODING FOR NORMAL READ TRANSACTION |
| 0 | 0 | OTHER FUNCTION |
|   | 1 | VOLTAGE CODE |

FIG. 7C

| READ/WRITE 1st transmitted bit (505) | VOLTAGE CHANGE/OTHER 2nd transmitted bit (510) | VOLTAGE CODE 3rd through 8th transmitted bits (515) |
|---|---|---|
| 1 | FOLLOWS ENCODING FOR NORMAL READ TRANSACTION | FOLLOWS ENCODING FOR NORMAL READ TRANSACTION |
| 0 | 1 | OTHER FUNCTION |
|   | 0 | VOLTAGE CODE |

FIG. 7D

SERIAL BUS PROTOCOL ENCODING FOR VOLTAGE REGULATOR WITH SUPPORT FOR DVFS

CROSS REFERENCE TO RELATED APPLICATION

This application claims the benefit of the filing date of U.S. Provisional Patent Application No. 62/562,313, filed on Sep. 22, 2017.

FIELD OF THE INVENTION

This invention relates generally to a voltage regulator, and more particularly, to the control of a voltage regulator to change an output voltage of the regulator, and still more particularly, to reducing latency in the signaling used to direct the voltage regulator to change an output voltage.

BACKGROUND OF THE INVENTION

One use of a voltage regulator is to adjust a voltage of power applied to a load. In particular, a voltage regulator may be used to support Dynamic Voltage and Frequency Scaling (DVFS) in a master processor of a personal mobile device, such as a smart phone. In DVFS, a voltage regulator is used to adjust the voltage applied to circuitry in the master processor over an operable range to control the processing speed of master processor. Thus, it is desirable for a voltage regulator to change the applied voltage as quickly as possible to reduce latency in applying the desired voltage to circuitry.

One factor in the speed that a voltage regulator changes the applied voltage is the signaling needed by a control system to communicate with the voltage regulator to indicate that voltage change is desired. Several techniques have been used to reduce the amount of time needed due to the time needed for a voltage regulator to receive a voltage change command. In one technique, dedicated pins connected to control logic in a voltage regulator are used to provide signals that control the output voltage of the regulator. However, the use of dedicated pins causes physical area overhead in the packaging and the Printed Circuit Board (PCB) routing of the voltage regulator. In addition, the use of dedicated pins adds to the production costs of the voltage regulator.

A second technique uses a serial bus to communicate voltage change commands from the control system to the voltage regulator. The use of a bus does reduce the physical area overhead of a voltage regulator. However, the use of a serial bus may add transmission latency to the voltage change to account for the voltage regulator receiving the command. Typically, the latency added is along the order of the period of a clock multiplied by the length of a voltage change command.

For example, a Serial Peripheral Interface (SPI) bus using SPI protocol may be used to provide the voltage change commands from a control system to a voltage regulator. A typical SPI command includes one bit field to distinguish a read versus a write operation, an address field of one or more address bits, an optional transaction field of optional length bits, and a data field of one or more data bits. In addition, the SPI command may include pad bits before, after, and/or between any of the described fields. In most applications, an SPI command is at least 24 bits or 3 bytes long. Thus, the latency caused by the command is at least 24 multiplied by the period of the clock signal used to synchronize the SPI transfer.

SUMMARY

Systems and methods in accordance with some embodiments of the invention may reduce the time needed to communicate a voltage change to a voltage regulator without the constraints placed on packaging and PCB routing caused by further additional pins. Furthermore, in various embodiments no additional hardware costs may be added to the production costs in order to reduce the communication time in accordance with many embodiments. Still further, in some embodiments latency of transmission of a change of voltage command may be reduced by a factor of three or more over other systems that use a serial bus to transmit a voltage change command from a control system to a voltage regulator.

Control logic in a voltage regulator performs the following process to use serial bus encoding to communicate voltage change commands in accordance with some embodiments of the invention. The control logic of a voltage regulator receives a serial stream of a plurality of bits. The number of bits in the serial stream is less than or equal to a byte. The control logic determines whether a portion of the serial stream indicates a voltage change command. If the serial stream indicates a voltage change command, the control logic determines a desired voltage change from voltage change information in a portion of the serial stream and causes the voltage regulator to change an output voltage from a previous output voltage to a new output voltage based on the desired voltage change. In some embodiments the serial stream indicates a voltage change command with a single bit.

In accordance with many embodiments, the control logic detects when the serial stream is being transmitted to the voltage regulator. In accordance with some further embodiments, the control logic receives a clock signal and uses the clock signal to receive the serial stream. The control logic also detects a write operation indicator in the serial stream in accordance with a number of embodiments. In accordance with some of these embodiments, the control logic determines the serial stream includes voltage change command by detecting a voltage change indicator in the serial stream. In accordance with some of these embodiments, the write operation indicator is a first bit of the serial stream and the voltage change indicator is a second bit in the serial stream.

In accordance with some embodiments of the invention, a control system communicates with a voltage regulator in the following manner to change an operating voltage of the voltage regulator. The control system receives an indication that an output voltage of a voltage regulator is to change. In response to the indication to change the output voltage, the control system generates a serial stream of bits that provide a voltage change command. The number of bits in the serial stream is less than or equal to a byte. The control system transmits the serial stream including the voltage change command to the voltage regulator.

In accordance with many embodiments, the control system generates a select signal that indicates the voltage regulator is to receive the serial stream. The select signal is applied by the control system to a select path connected to the voltage regulator. In accordance with some of these embodiments, the control system obtains a clock signal and provides the clock signal to the voltage regulator over a clock bus. In accordance with many of these embodiments, the control system inserts a write operation indicator in the serial stream. The control system also inserts a voltage change indicator in the serial stream in accordance with a number of these embodiments. In accordance with a few of these embodiments, the write operation indicator is a first bit of the serial stream and the voltage change indicator is a second bit in the serial stream.

These and other aspects in accordance with various embodiments of the invention are more fully comprehended in light of the drawings and the following description.

BRIEF DESCRIPTION OF THE DRAWINGS

FIGS. 7A-7D illustrate encodings of voltage change commands in various SPI transactions in accordance with various embodiments of the invention.

DETAILED DESCRIPTION

A voltage regulator in accordance with some embodiments of the invention changes an output voltage in response to a voltage change command received from a control system over a serial bus. In accordance with many embodiments, the length of the voltage change command is reduced to less than a byte. The voltage change command in accordance with some of these embodiments is a serial stream of bits that includes a request for a voltage change in one portion of the serial stream and voltage change information indicating the desired voltage in a second portion of the stream.

In accordance with some embodiments that use the SPI protocol for transmissions between the control system and the voltage regulator, the request for a voltage change portion includes a first bit that indicates a write operation from the control system to the voltage regulator and a second bit that indicates a voltage change command. The voltage change information portion is not more than 6 bits in length and follows the voltage change indicator bit. The voltage change information includes data that is used to determine the new output voltage. The use of a single byte to transmit the command reduce the transmission latency by approximately a factor of 3 over conventional SIP commands. In accordance with a number of these embodiments, the voltage information portion is a 3-bit sequence that may indicate up to 8 different desired voltages that reduces the transmission latency by a factor of 4.8.

The encoding of the voltage change command by a control system and the operation of a voltage regulator in response to receiving a voltage change command in accordance with various embodiments of the invention are described in detail below.

Figure 1:
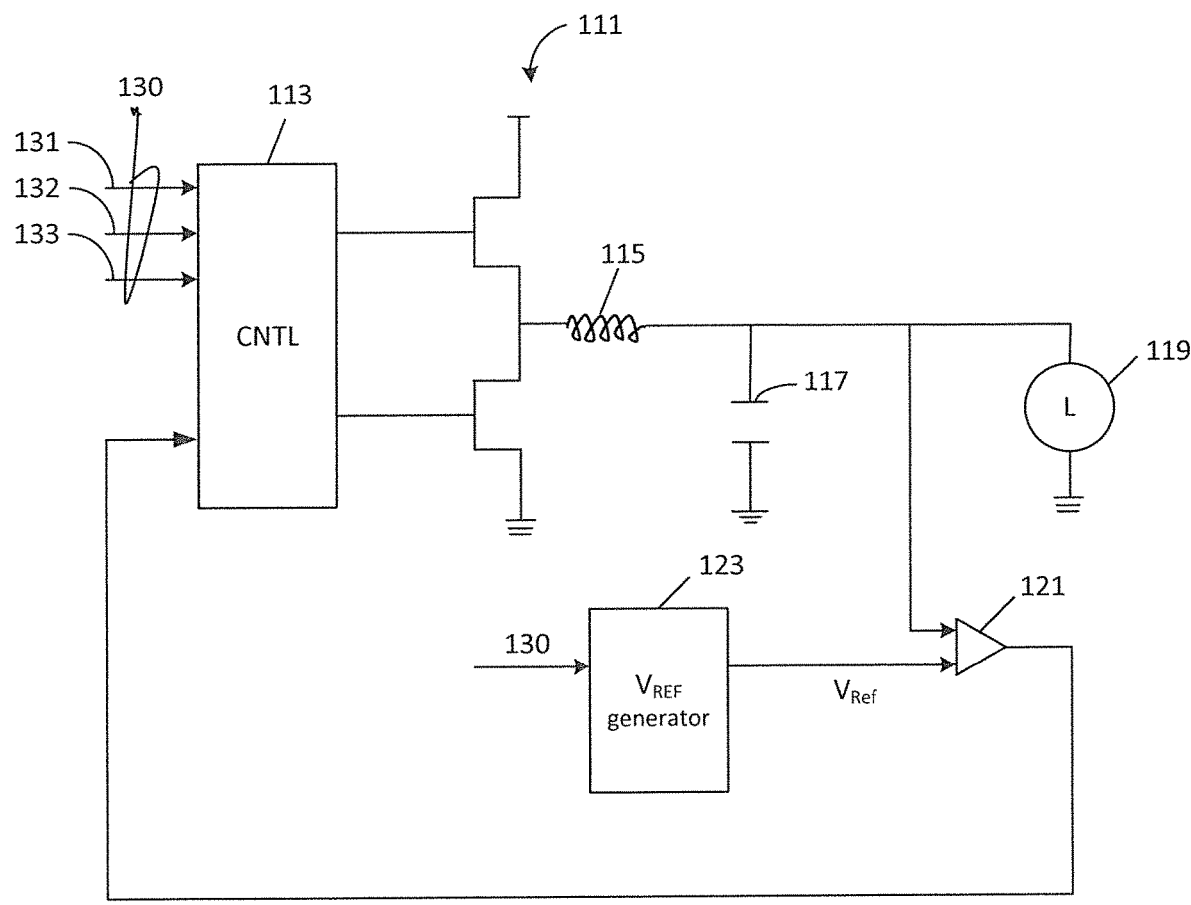
FIG. 1 illustrates operation components of a DC-DC switching converter that is a voltage regulator in accordance with an embodiment of the invention.

FIG. 1 illustrates a DC-DC switch converter that acts as a voltage regulator in accordance with an embodiment of the invention. It will be noted that the DC-DC switch converter shown in FIG. 1 is an example of a voltage regulator and that certain components of the converter have been omitted from clarity and brevity. In FIG. 1, the DC-DC switch converter operates switches 111 to regulate voltage applied to a load 119. In doing so, the converter operates the switches 111 based signals received from a control system via bus 130 and/or comparator 121. The DC-DC switch converter shown in FIG. 1 includes control logic 113, switches 111, output inductor 115, output capacitor 117, reference voltage generator 123 and comparator 121.

Control logic 113 receives signals from a control system via bus 130 and signals from comparator 121. Bus 130 is connected to a control system (not shown) and includes chip select path 131, serial data path 132, and clock path 133. Chip select path 131 is used to provide a signal that the control system is communicating with control logic 113. Serial data path 132 is used to transmit data from a control system at a rate of one bit per clock period. Clock path 133 is used to transmit a clock signal from the control system to control logic 113 for use in reading data from serial data path 132. In accordance with some embodiments, data is transmitted via bus 130 using a serial data protocol. In accordance with many of these embodiments, the serial data protocol used is SPI.

Switches 111 are connected in series between a high voltage source and a low voltage source. In accordance with some embodiments, the low voltage source is ground. The outputs of switches 111 are connected to output inductor 115. The gates of switches are connected to control logic 113 to allow control logic 113 to activate and deactivate the switches to apply current from high voltage source or low voltage source to output inductor 115. Switches 111 provide the current to output inductor 115 in accordance with a configuration specified by control logic 113.

A first terminal of the output inductor 115 is connected to a node between switches 111. A second, output terminal of output inductor 115 is connected to a first terminal of output capacitor 117. Output capacitor 117 also has a second terminal connected to ground. The output capacitor 117 generally supplies an output voltage to a terminal of load 119, which is shown as having another terminal connected to ground.

Comparator 121 receives as inputs the output of the output inductor 115/output capacitor 117 and a reference voltage from reference voltage generator 123. Reference voltage generator 123 provides a reference voltage that has a magnitude equal to the desired output voltage of the DC-DC converter, minus a tolerance amount. Reference voltage generator 123 determines the reference voltage from the signals received via bus 130. In general, it is preferred that the DC-DC converter provide an output voltage equal to the reference voltage, but not lower than the reference voltage minus the tolerance amount. Comparator 121 is configured to produce a signal indicating whether the output voltage of the DC-DC converter is greater than or less than the reference voltage minus the tolerance amount. In some embodiments, comparator 121 outputs a high signal when the output voltage is lower than the reference voltage minus the tolerance amount, and outputs a low signal otherwise.

Control logic 113 receives signals resulting output by comparator 121 and signals from bus 130. The configuration of gates 111 is adjusted by control logic 113 to provide a current from the voltage sources that causes the determined desired output to be generated voltage and applied to load 119.

Although a DC-DC switch converter that acts as voltage regulator in accordance with various embodiments of the invention is described with reference to FIG. 1, other DC-DC switch convertors and/or system that perform as voltage regulators that add, combine, modify and/or remove components shown in FIG. 1 are possible in accordance with various other embodiments of the invention.

Figure 2:
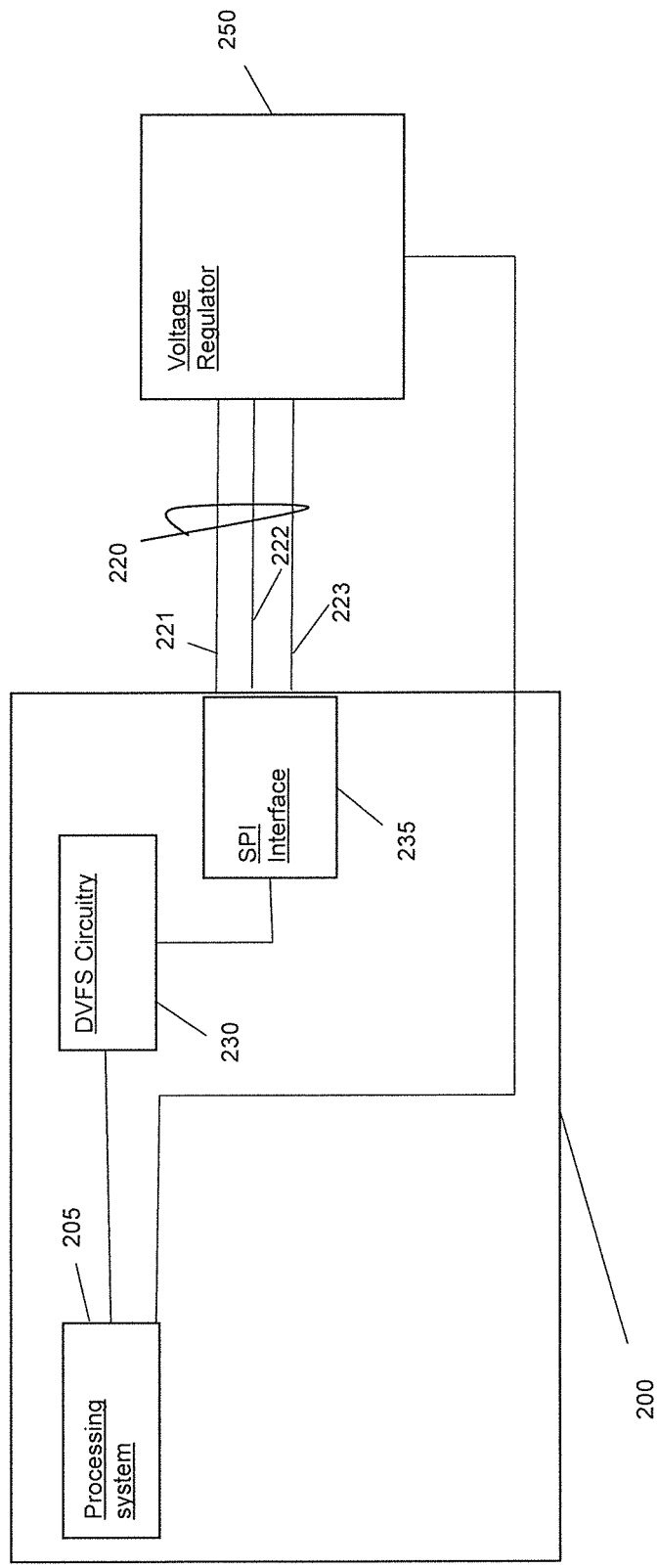
FIG. 2 illustrates a block diagram of operational components of a control system connected to a voltage regulator in accordance with an embodiment of the invention.

FIG. 2 illustrates a block diagram of components of a control system communication with a voltage regulator, in accordance with an embodiment of the invention. Control system 200 includes a processing system 205. Processing system 205 is circuitry that performs instructions stored in memory to perform a process. In accordance with various embodiments of the invention, processing system 205 may be a processor, microprocessor, controller, logic unit, or any combination of the preceding components in accordance with various embodiments of the invention.

DVFS circuitry 230 in control system 200 is connected to processing system 205 to communicate with processing system 205. IDVFS circuitry 230 receives signals that indicating a desired voltage to be applied to processing system 205. In accordance with some embodiments, the signals indicate a desired voltage level. In accordance with some other embodiments, the signals indicate a current state of processing system 205 and DVFS circuitry 230 determines a current desired voltage for processing system 205 based on the signals. Based on the desired voltage, DVFS circuitry 230 may issue a voltage change command to a voltage regulator when needed. Voltage change commands in accordance with various embodiments of the invention are discussed in more detail with respect to FIGS. 3-7.

An SPI interface 235 is a bus interface that generates proper signals for transmission over communications bus 220 and applies the signals to the proper paths of communications bus 220 to communicate with a voltage regulator 250 also connected bus 220. SPI interface 235 generates signals in accordance with an SPI protocol. In accordance with various other embodiments, other interfaces that generate signals in different protocols may replace SPI interface 235 in control system 200. In accordance with a number of embodiments, SPI interface also includes circuitry for receiving signals from voltage regulator 250 and converting the signals to data for use by control system 200.

Control system 200 includes communications bus 220 that connects control system 200 to a voltage regulator 250 to communicate with voltage regulator 250. The voltage regulator may be as discussed with respect to FIG. 1, for example. Communications bus 220 includes a chip select path 221, a serial data path 222, and a clock path 223. Chip select path 221 is a path used to transmit a signal from control system 200 to the voltage regulator to indicate that the control system is communicating with the voltage regulator via serial data path 221. Serial data path 221 is a data path that communicates a single bit of data over the path per clock period to allow data to be passed from control system 200 to the voltage regulator 250. Clock path 223 is used to transmit a clock signal from control system 200 to the voltage regulator 250 for use in reading data from serial bus path 221. In accordance with some embodiments, communications over bus 220 are serial communications where data is sent over a single path of the bus at a rate of one bit per period of the provided clock. In accordance with many of these embodiments, a serial data protocol is used to transmit the data. In accordance with a number of these embodiments, the serial data protocol used is SPI.

Voltage regulator 250 communicates with control system 200 over bus 220. In accordance with some embodiments, the voltage regulator 250 is configured in the manner described with reference to FIG. 1. In accordance with many embodiments of the invention, voltage regulator 250 receives a voltage change commands issued by DVFS circuitry 230 via bus 220, changes the current output voltage to a desired output voltage based on the voltage change command and applies the desired voltage is applied to processing system 205.

Although control systems and voltage regulators in accordance with various embodiments of the invention are described with reference to FIG. 2, other processing systems and/or voltage regulators that add, remove, modify, and/or combine components based on the system requirements of the particular control systems and voltage regulators are possible in accordance with various other embodiments of the invention.

Figure 3:
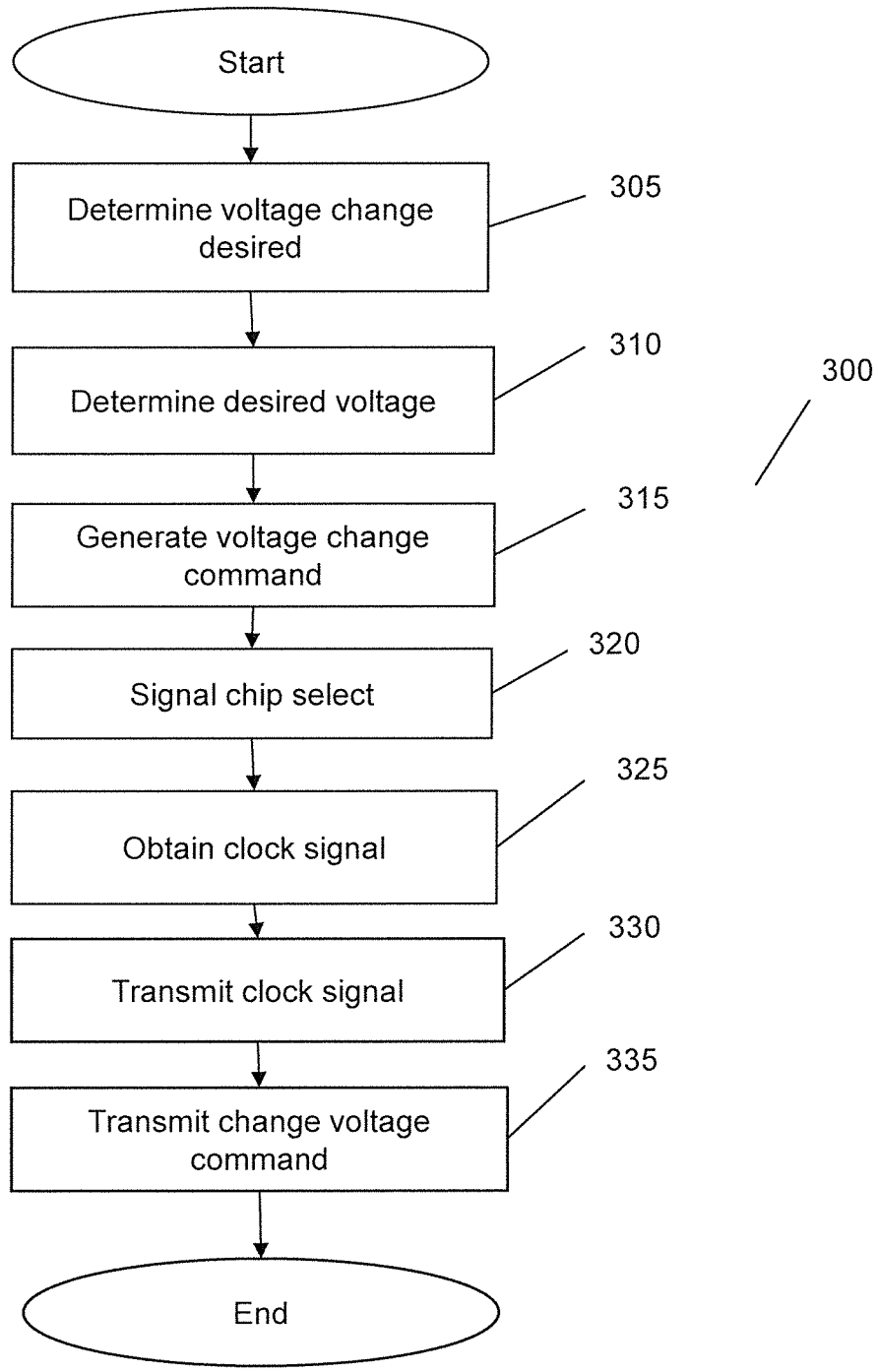
FIG. 3 illustrates a flow diagram of a process performed by a voltage regulator to receive a voltage change command and change an output voltage of the regulator in accordance with an embodiment of the invention.

FIG. 3 is a flow diagram of a process performed by a control system to change an output voltage of a voltage a regulator in accordance with an embodiment of the invention. In accordance with many embodiments, the process is performed by DVFS circuitry in the control system. In process 300, the control system determines that the output voltage of the voltage regulator is to be changed (305). In accordance with some embodiments, the need for the change is determined based on data received from the voltage regulator. In accordance with many embodiments, the need for the change is determined from data received from another system. In some of these embodiments, the data is received from a processing system receiving the output voltage from the voltage regulator. The control system determines a new desired output voltage for the voltage regulator and/or the amount of the change needed in the current output voltage of the voltage regulator (310). In accordance with some embodiments, the desired output voltage and/or amount to change current output voltage is determined based on data received from the voltage regulator. In accordance with many embodiments, the desired output voltage and/or amount to change current output voltage is determined based on data received from another system. In a number of these embodiments, the The control system generates a voltage change command (315). The voltage change command is less than one byte and includes a voltage change request portion and voltage change information portion. In accordance with some embodiments, the voltage change request portion includes a write operation indicator in a write operation filed and voltage change indicator in a voltage change field. In accordance with many of these embodiments, the write operation field is a one bit field and/or the voltage change field is a one bit field. In a number of these embodiments, the write operation field is the first bit of voltage change command and the voltage change field is a second bit of the voltage change command. In accordance with some embodiments, the voltage change information portion is up to six bits in length. In accordance with a number of these embodiments, the voltage change information is three bits in length. In accordance with many embodiments, the voltage change information is a field that is 3 to 6 bits in length. In a number of these embodiments, the voltage change information field is after the voltage change field in a voltage change command.

The control system applies a signal to the chip select path connected to the voltage regulator to indicate that the control system is communicating with the regulator (320). In accordance with some embodiments, the signal may be driving the chip select path high. In accordance with some other embodiments, the signal may be driving the chip select path low. The control system obtains a clock signal (325) applies the clock signal to the clock signal path of the bus connected to the voltage regulator (330) for use by the voltage regulator to obtain data transmitted from the control system. In accordance with some embodiments, the clock signal may be obtained from a clock in the control system. In accordance with some other embodiments, the clock signal may be obtained from a system clock external to the control system. The control system serially transmits the generated voltage change command over a serial data path of the bus to the voltage regulator (335) and process 300 ends.

Although various embodiments of a process performed by control systems to change an output voltage of a voltage regulator are described with reference to FIG. 3, other processes for changing the voltage output of a voltage regulator that add, combine, modify, and/or remove steps of the processes may be performed in accordance with various other embodiments of the invention.

Figure 4:
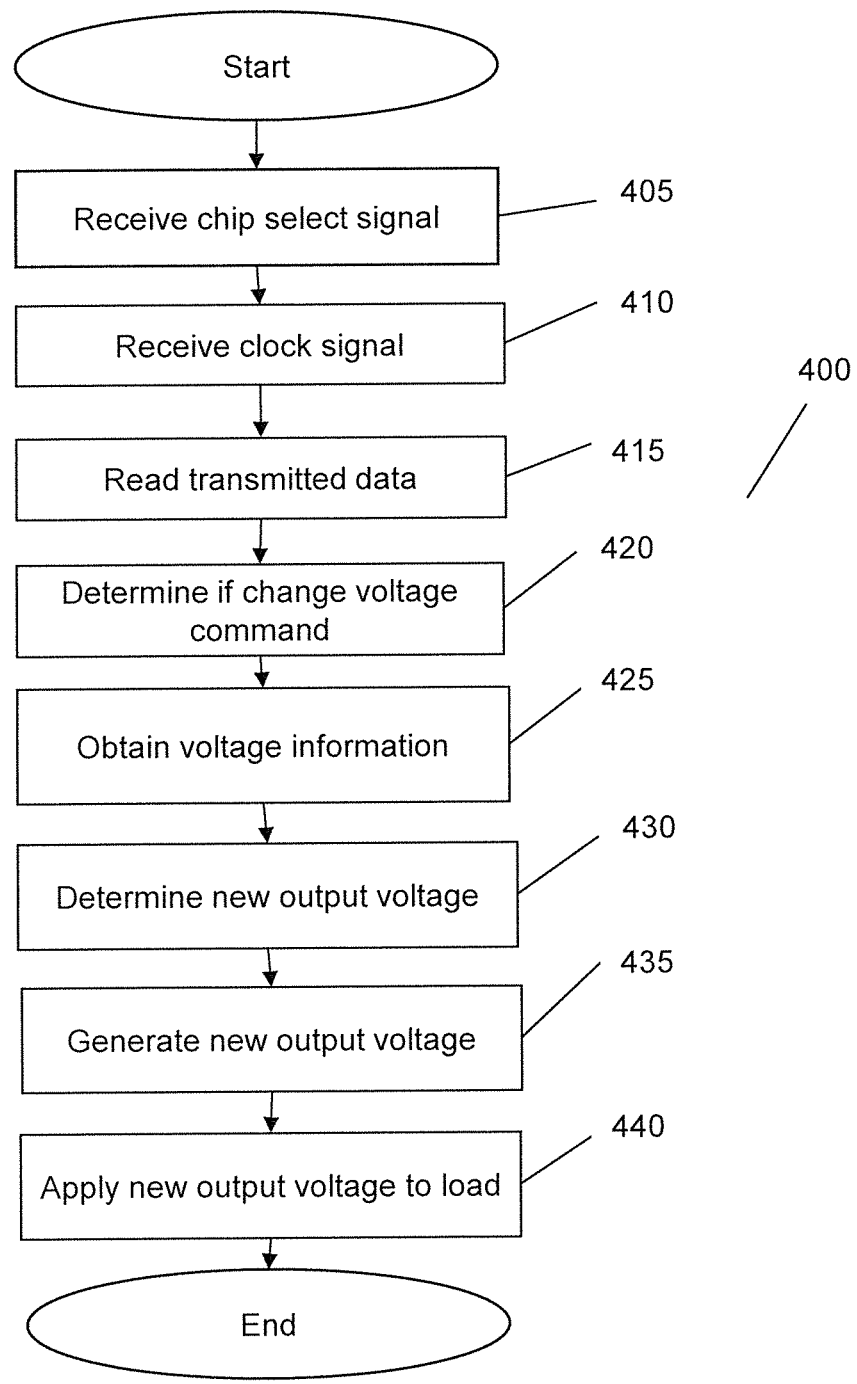
FIG. 4 illustrates a flow diagram of a process performed by control system to generate a voltage change command and transmit the command to a voltage regulator in accordance with an embodiment of the invention.

FIG. 4 illustrates a flow diagram of a process performed by a voltage regulator to change an operating voltage of the regulator in accordance with an embodiment of the invention. In accordance with some embodiments, process 400 is performed by a voltage reference generator, for example the voltage reference generator 123 of FIG. 1. In accordance with some embodiments, process 400 is performed by control logic in the voltage regulator. In process 400, the voltage regulator receives a signal over the chip select path indicating that the control system is communicating with the voltage regulator (405). In accordance with some embodiments, the chip select path is set high to indicate the control system is communicating with the voltage regulator. In accordance with some other embodiments, the chip select path is set low to indicate the control system is communicating with the voltage regulator. The voltage regulator obtains the clock signal from the clock path (410). The data transmitted by the control system is read from the serial data path based upon the obtained clock signal (415).

As the data is being read, the voltage regulator determines whether the data is a voltage change command (420). In accordance with some embodiments, the determination includes determining whether the data includes a voltage change command. In accordance with many of these embodiments, the determination includes determining whether a write operation is indicated in a write operation filed. In response to a write operation is indicated, the voltage regulator determines whether a voltage change indicator is present in a voltage change field.

If the regulator determines that data is a voltage change command, the voltage regulator obtains the voltage information (425). In accordance with some embodiments, the voltage regulator obtains the voltage change information by reading a certain number of the next bits received. The obtained voltage change information is then used to determine a new output voltage and/or a change in the current output voltage. (430). In accordance with some embodiments, the voltage change information is used to calculate the new output voltage and/or the change in the current output voltage. In accordance with some other embodiments, the voltage change information may be used to determine a register, set of registers, or portion of memory that stores the new output voltage value and the new output voltage value is read designated register(s). The voltage regulator generates the new output voltage (435) and applies the new output voltage to the load (440). In accordance with some embodiments, the load is processor system. After the new voltage is being applied to the load, process 400 ends.

Although various embodiments of a process performed by a voltage regulator to change an output voltage based on a command from a control system are described with reference to FIG. 4, other processes for changing the voltage output of a voltage regulator that add, combine, modify, and/or remove the disclosed steps of these processes may be performed in accordance with various other embodiments of the invention.

Figure 5:
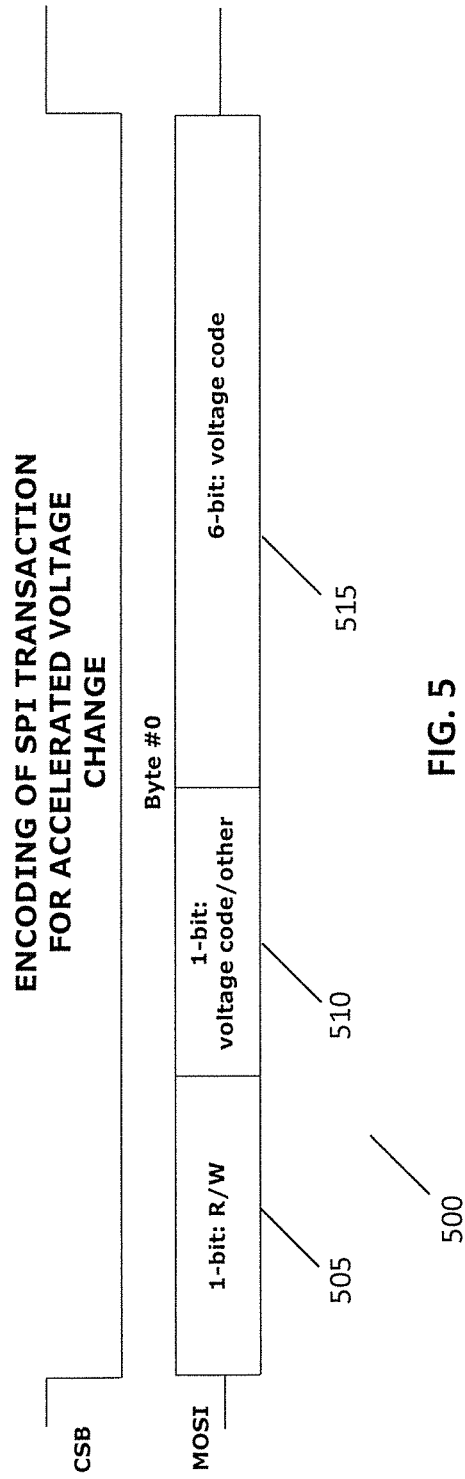
FIG. 5 illustrates an encoding of an SPI transaction encoding a voltage change command for requesting a changing in the output voltage of a voltage regulator in accordance with an embodiment of the invention.

In accordance with some embodiments of the invention, the transmission latency for a voltage change command is reduced based upon the encoding of the voltage change command. The voltage change command is a byte or less in length in accordance with many of these embodiments. In accordance with a number of these embodiments, the voltage change command is encoded based on the SPI protocol. As such, the latency may be reduced by factor of three based upon the encoding of the voltage change command in accordance with many embodiments of invention. FIG. 5 illustrates a voltage change command encoded in the SPI protocol in accordance with an embodiment of the invention. In FIG. 5, voltage change command 500 includes a 1-bit read/write field 505, a 1-bit voltage change field 510, and a voltage information field 515 that is up to 6 bits in length.

1-bit read/write field 505 indicates whether the command is being written to the voltage regulator or requesting information to be read from the voltage regulator. In accordance with many embodiments, the 1-bit read/write field is the first bit encoded in the transmission. In accordance with some embodiments, a voltage change command is a write operation. In accordance with many of these embodiments, the write operation is indicated by a zero or low signal in 1-bit read/write field 505. In accordance with many other of these embodiments, the write operation is indicated by a one or high signal in read/write field 505.

1-bit voltage change field 510 indicates whether or not a write operation is a voltage change request or other type of operation. In accordance with many embodiments, the 1-bit voltage change field is the second bit in the encoded transmission. In accordance with some embodiments, a zero or low signal in 1-bit voltage change field 510 indicates a voltage change command and one or high signal in 1-bit voltage change filed 510 indicates that the communication is another type of communication. In accordance with some other embodiments, a one or high signal in 1-bit voltage change field 510 indicates a voltage change command and a zero or low signal in 1-bit voltage change field 510 indicates that the communication is another type of communication.

Voltage information field 515 is up to 6 bits in length and includes information used by a voltage regulator to determine a new output voltage. In accordance with many embodiments, the voltage information field includes the third up to the sixth bit in the encoded transmission. In accordance with some embodiments, the information in voltage information field 515 indicates a new output voltage. In accordance with some other embodiments, the information in voltage information field 515 indicates a change in the current output voltage that is combined with the current output voltage to determine the new output voltage. In accordance with a number of other embodiments, the information in voltage information field 515 is information that may be used to calculate the new output voltage. In accordance with still other of these embodiments, the information in voltage information field 515 indicates particular registers or an address in a memory that stores the new output voltage.

Although voltage command codes in accordance with various embodiments of the invention are described with reference to FIG. 5, other encoding that add, remove, combine, and/or modify the fields of a voltage command code in accordance with various other embodiments of the invention are possible.

Figure 6:
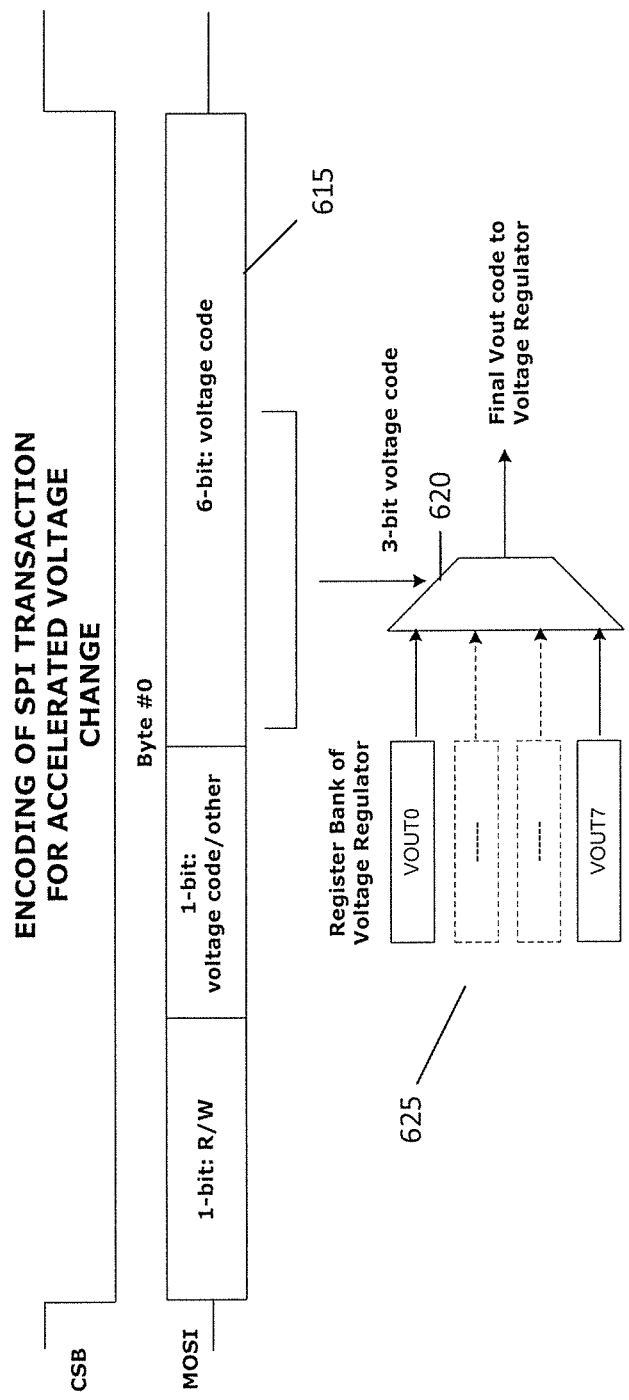
FIG. 6 illustrates an encoding of an SPI transaction encoding a voltage change command and components in the voltage regulator that use voltage change information from the voltage change command to determine a desired voltage for a voltage regulator in accordance with an embodiment of the invention.

FIG. 6 conceptually illustrates a voltage change command and portions of a voltage regulator that use the voltage change command to determine a new output voltage in accordance with an embodiment of the invention. In FIG. 6, voltage change command 600 is similar to the voltage change command described above with reference to FIG. 5. However, voltage information field 615 is 3 bits in length. The three bits in the voltage information field 615 are read by the voltage regulator and applied to selector 620 to select one of eight voltage levels stored in register in register bank 625. In some embodiments the selector 620 may be part of a voltage reference generator, for example the voltage reference generator 123 of FIG. 1, while in some embodiments the selector 620 may provide its output to the voltage reference generator. Although register bank 625 is shown as storing eight voltage values, register bank 620 may store any number up to 64 of voltage values with the appropriate number of bits from up to 6 bits in the voltage information field 615 being used to select a desired voltage value from register bank 625 in accordance with various embodiments of the invention.

FIGS. 7A-7D illustrate various different encodings of a voltage change command in accordance with various embodiments of the invention. In the voltage command shown in FIG. 7A, a write operation is indicated by a one or high signal in read/write field 505, a one or high signal in 1-bit voltage change field 510 that indicates a voltage change command. In the voltage change command shown in FIG. 7B, a write operation is indicated by a one or high signal in read/write field 505, and a zero or low signal in 1-bit voltage change field 510 that indicates a voltage change command. In the voltage change command shown in FIG. 7C, a write operation is indicated by a zero or low signal in read/write field 505, a one or high signal in 1-bit voltage change field 510 indicates a voltage change command. In the voltage change command shown in FIG. 7D, a write operation is indicated by zero or low signal in read/write field 505, and a zero or low signal in 1-bit voltage change field 510 indicates a voltage change command, and the voltage information field 515 includes the voltage information in the third through up to the eighth bit. In each of FIGS. 7A-7D, the voltage information field includes encoded bits in each of third through up to the eighth bit of the voltage command.

Although the invention has been discussed with respect to various embodiments, it should be recognized that the invention comprises the novel and non-obvious claims supported by this disclosure.

What is claimed is:

1. A control logic for a voltage regulator comprising:
   receiving circuitry configured to receive a serial stream comprising a command, wherein the command consists of at most a byte, wherein the command comprises a read/write flag and a voltage change/other flag;
   determination circuitry configured to determine a desired output voltage from voltage information in a voltage change information portion of the command when the read flag is set to write and the voltage change/other flag is set to voltage change;
   voltage change circuitry configured to change an output voltage of the voltage regulator from a previous output voltage to the new output voltage based on the determined new output voltage, wherein the voltage change circuitry does not change the output voltage of the voltage regulator when the voltage change/other flag is set to other.

2. The control logic of claim 1 further comprising:
   chip select circuitry configured to detect when the command is being transmitted to the voltage regulator.

3. The control logic of claim 1 further comprising:
   clock receiving circuitry configured to receive a clock signal; and
   clock path circuitry configured to use the clock signal to differentiate bits of the command.

4. The control logic of claim 1 wherein the determination circuitry comprises:
   circuitry configured to detect a write operation indicator in the command.

5. The control logic of claim 4 wherein the determination circuitry comprises:
   circuitry configured to detect a voltage change indicator in the command.

6. The control logic of claim 4 wherein the write operation indicator is a first bit of the command and the voltage change indicator is a second bit in the command.

7. A control system for communicating with a voltage regulator to change an operating voltage of the voltage regulator comprising:
   a processor;
   memory accessible by the processor that comprises instructions that direct the processor to:
     generate a first command having that provides a write instruction, a voltage change instruction, and a desired output voltage instruction wherein a number of bits in the first command is less than or equal to a byte,
     transmit the first command to a voltage regulator,
     generate a second command that provides a write instruction, an other function instruction, and a series of bits encoding the other function, wherein a number of bits in the second command is equal to the number of bits in the first command, and
     transmit the second command to the voltage regulator.

8. The control system of claim 7 wherein the instructions further include instructions that direct the processor to:
   generate a select signal that indicates the voltage regulator is to receive the first and second command, and
   apply the select signal to a select path connected to the voltage regulator.

9. The control system of claim 7 wherein the instructions further include instructions that direct the processor:
   obtain a clock signal; and
   provide the clock signal to the voltage regulator over a clock path.

10. The control system of claim 7 wherein the instructions to generate the first command include instructions that direct the processor to:
    insert the write operation instruction in the first command.

11. The control system of claim 10 wherein the instructions to generate the first command include instructions that direct the processor to:

insert the voltage change instruction in the first command.

12. The control system of claim 10 wherein the write operation command is a first bit of the first command and the voltage change command is a second bit in the first command.

13. The control system of claim 7 wherein the instructions further direct the processor to:
- generate the desired output voltage instruction; and
- encode the desired output voltage instruction into the first command wherein the desired output voltage instruction is three to six bits in length.

14. The control logic of claim 1, wherein the receiving circuitry is configured to receive the serial stream from an SPI (serial data protocol) interface via an SPI protocol.

15. The control logic of claim 14, wherein the serial stream comprises an SPI command having a length of 3 bytes.

16. The control logic of claim 1, wherein the determination circuitry comprises a selector that receives at least three bits of the command to select the desired output voltage from at least one of eight voltage levels stored in a register of a register bank.

17. The control logic of claim 15, wherein a voltage reference generator comprises the determination circuitry.

\* \* \* \* \*